United States Patent [19]
Sridhar et al.

[11] Patent Number: 5,770,677
[45] Date of Patent: Jun. 23, 1998

[54] PROCESS FOR THE REMOVAL OF ALKALI FROM CONDENSATION RESINS

[75] Inventors: Srinivasan Sridhar, Marl; Ulrich Diester, Olfen; Christian Rohde, Marl, all of Germany

[73] Assignee: Huels Aktiengesellschaft, Marl, Germany

[21] Appl. No.: 797,124

[22] Filed: Feb. 10, 1997

[30] Foreign Application Priority Data

Feb. 10, 1996 [DE] Germany ........................ 196 04 903.2

[51] Int. Cl.$^6$ ..................................................... C08G 2/18
[52] U.S. Cl. .......................... 528/227; 204/155; 204/554; 528/482
[58] Field of Search ................................... 528/227, 482; 204/155, 554

[56] References Cited

U.S. PATENT DOCUMENTS 3,520,850  7/1970  Kiss ......................................... 528/227
4,731,434  3/1988  Dörffel ..................................... 528/227

*Primary Examiner*—John M. Cooney, Jr.
*Attorney, Agent, or Firm*—Oblon, Spivak, McClelland, Maier & Neustadt, P.C.

[57] ABSTRACT

A process for the preparation of a condensation resin of low catalyst content from a ketone and an aldehyde comprising reacting the ketone and aldehyde in a polycondensation reaction in an aqueous medium in the presence of a basic catalyst to form the resin, which is contaminated with alkali ions from the basic catalyst, and then exposing the resin to an electrical field in a cell demarcated by ion-selective membranes permeable to the alkali ions whereby alkali ions are caused to migrate out of the resin through the membranes. Also, a process for the removal of alkali from condensation resins as described above.

18 Claims, 1 Drawing Sheet

5,770,677

PROCESS FOR THE REMOVAL OF ALKALI FROM CONDENSATION RESINS

BACKGROUND OF THE INVENTION

1. Field of the Invention

The invention relates to a process for the preparation of condensation resins of low catalyst content. The invention also relates to a process for the removal of the alkali employed as the catalyst from the condensation resins.

2. Description of the Background

The preparation of condensation resins has been known for a long time. Such synthetic resins can be prepared by polycondensation from ketones, such as, for example, methyl ethyl ketone or acetophenone, and aldehydes, such as, for example, formaldehyde, using the well-known aldol condensation reaction. The reaction step is usually carried out in an aqueous medium using an alkali, such as, for example, sodium hydroxide solution, as the catalyst. After the reaction has ended, a reaction mixture results which contains an aqueous phase above the resin phase. The aqueous phase comprises a majority of the alkali and is removed. However, a smaller portion of the alkali remains in the resin. In order to remove the alkali from the resin, the resin is first taken up by a solvent and the organic phase formed by this procedure is extracted with water; the resin is washed free of the alkali in this manner. For example, DE-33 24 287 A1 describes the use of methylene chloride as a solvent for this purpose. However, extraction connotes that the resin and the solvent must be separated again afterward. Furthermore, the wash water must also be worked up, since it is an alkaline waste water.

Summarizing, the conventional process for the preparation of resins of low catalyst content thus has the following problems:

1. the use of substances foreign to the system, which should not remain in the resin at the end and also must be recovered, such as, for example, the use of a solvent,
2. several expensive process steps, such as the steps of extraction, recovery of the solvent and working up of the waste water, and
3. the potential ecological pollution by the alkali if the waste water is not worked up and the alkali is not recycled into the process.

The object of the present invention was therefore to provide a process for the preparation of condensation resins of low catalyst content which avoids the above-mentioned problems, and in particular is achieved without the use of auxiliaries foreign to the process, such as solvents or reagents.

SUMMARY OF THE INVENTION

According to the invention, the object has been achieved by a process for the preparation of condensation resins of low catalyst content from ketones and aldehydes by means of polycondensation in an aqueous medium in the presence of basic catalysts, in which the resin obtained in a manner known per se is exposed to an electrical field in a space (referred to below as a "cell") demarcated by ion-selective membranes permeable to the alkali ions, and in which the alkali ions migrate out of the resin through the membranes. According to the invention, the electrical field thus serves as a driving force for the removal of the alkali from the resin. The invention therefore particularly relates to a process for the removal of alkali from a resin prepared from ketones and aldehydes by polycondensation in an aqueous medium in the presence of basic catalysts, in which the resin is exposed to an electrical field in a cell demarcated by ion-selective membranes permeable to the alkali ions, and in which the ions migrate out of the resin through the membranes.

DESCRIPTION OF THE PREFERRED EMBODIMENTS

The processes according to the invention, (also referred to below as "electroextraction"), allow the resin, which is contaminated with alkali as a result of the preparation, to be freed from the alkali as far as possible or desired without the use of auxiliaries foreign to the system, and at the same time render it possible for the alkali removed to be recovered in a pure form and to be recycled again, preferably to the preceding reaction step. The process for the preparation of resins of low alkali content is simplified considerably by this procedure, since the process steps for recovery of the solvent or working up of the waste water can be omitted. Ecological pollution is avoided by recirculating the alkali. The addition of an acid for neutralization of the wash water can be omitted, which also means that the production of a neutralization salt obtained by this procedure, including the associated environmental pollution, is suppressed.

After removal, the alkali is preferably taken up outside the cell by pure alkali which has been initially introduced there and is recovered in this manner. The same alkali which the resin also comprises is preferably initially introduced. From here, the alkali can preferably be made available again to the condensation process. Both the removal, according to the invention, of the alkali and the recycling of the alkali can be carried out continuously or discontinuously.

The processes according to the invention can also be used subsequently on resins prepared conventionally, for example for the purpose of after-purification. In this case, the resins to be treated can preferably be dissolved or suspended in water or alkali.

The processes according to the invention can be applied to all resins prepared from ketones and aldehydes by polycondensation in an aqueous medium in the presence of basic catalysts. However, resins from acetophenone or its corresponding derivative thereof capable of undergoing a polycondensation reaction with an aldehyde, and formaldehyde, or from cyclohexanone or its corresponding derivative thereof capable of undergoing a polycondensation reaction with an aldehyde, and formaldehyde, are particularly suitable.

The electroextraction processes according to the invention can be carried out continuously or discontinuously by an electrolytic or electrodialytic route. The strength of the electrical field applied depends on the procedure conditions and is to be chosen such that the effect according to the invention is achieved.

Figure 1:
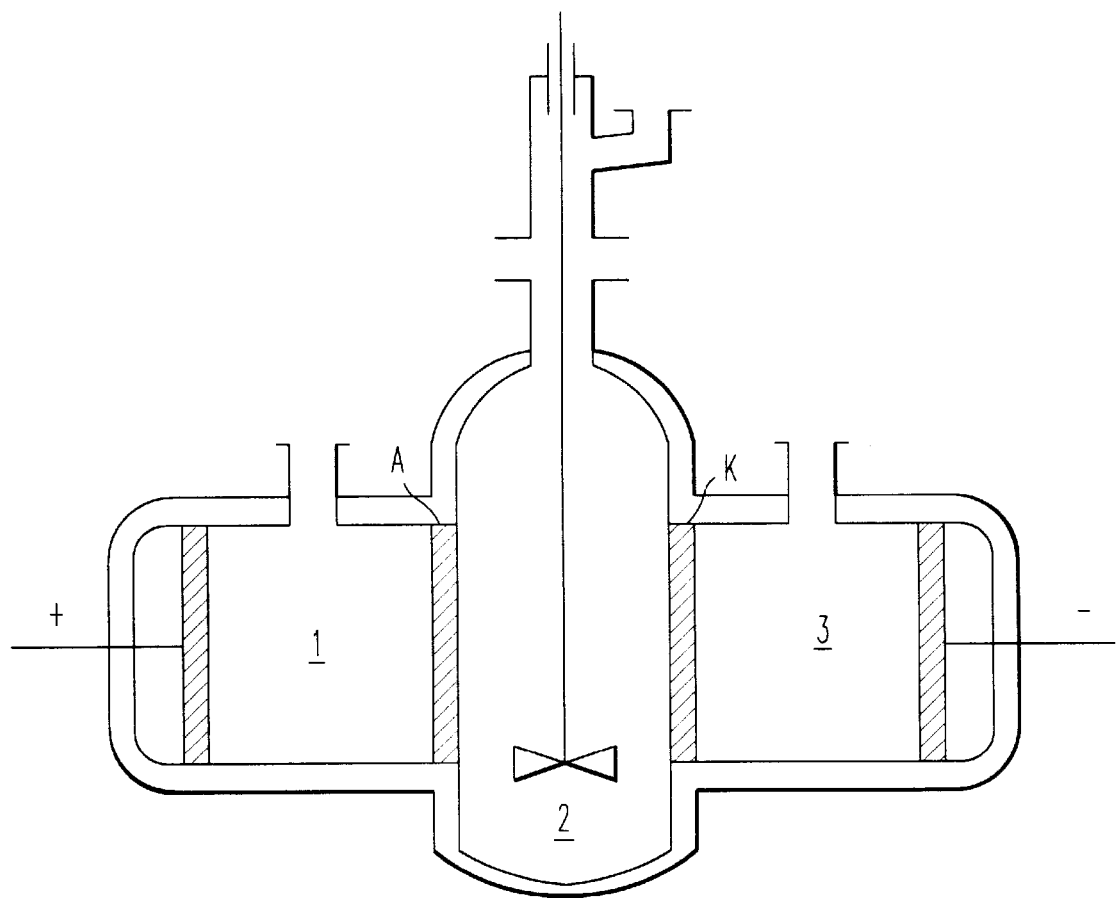
FIG. 1 is a cell in which the electrolysis embodiment of the present invention can be practiced.

In the electrolytic embodiment of electroextraction, an electrolysis cell in which a cation exchange membrane K and an anion exchange membrane A are located between the two electrodes is employed (FIG. 1). Three chambers are formed as a result. Pure alkali which functions as a solution for taking up the alkali to be removed from the resin is preferably initially introduced into anode chamber 1 and cathode chamber 3. The same alkali also contained in the resin is preferably initially introduced. The resin is in the central chamber 2. In the case of, for example, sodium hydroxide solution as the alkali, the $Na^+$ ions migrate in the electrical field from the resin chamber 2 through the cation exchange membrane in the direction of the cathode (labeled −) into the catholyte in chamber 3. The $OH^-$ ions similarly migrate from the resin chamber through the anion exchange membrane in the direction of the anode (labeled +) into the anolyte in chamber 1. Oxygen and water are formed from the $OH^-$ ions at the anode. In the presence of the $Na^+$ ions, sodium hydroxide solution is formed again in the catholyte, with the formation of hydrogen. The resin remains in the resin chamber.

Figure 2:
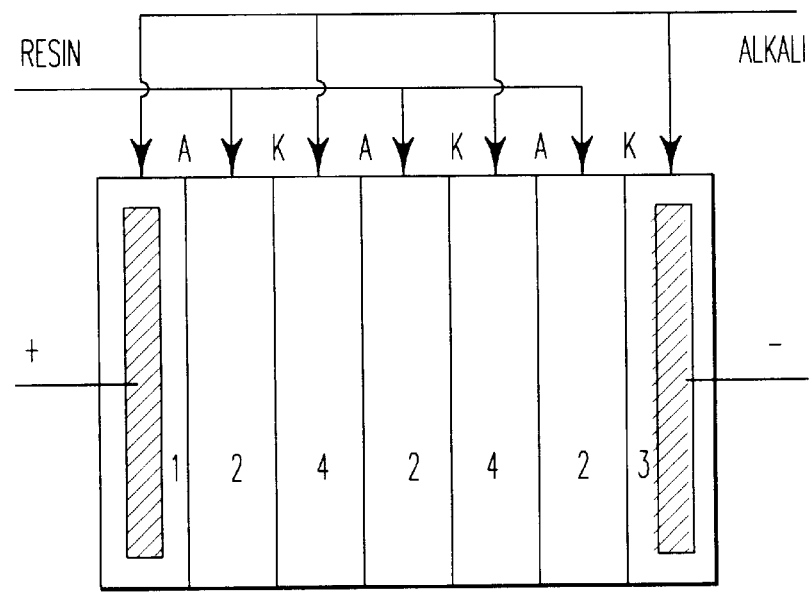
FIG. 2 is a cell in which the electrodialysis embodiment of the present invention can be practiced.

In another embodiment of the electroextraction, the principle of electrodialysis is used. In this method, a large number of cation and anion exchange membranes are inserted between the electrodes (FIG. 2). Each pair of these membranes demarcates a chamber. The chambers are charged alternately with the resin to be treated and, preferably, alkali. FIG. 2 shows this embodiment with the resin chambers 2 and the alkali chambers 4. The same alkali also contained in the resin is again preferably initially introduced. In the case of sodium hydroxide solution as the alkali, the $Na^+$ and the $OH^-$ ions migrate out of the resin chambers into the adjacent alkali chambers. When considered per se, a pair of a resin and alkali chamber represents a functional unit. The advantage of this variant over the electrolytic method described above is that several such units can be inserted between the electrodes and a larger amount of alkali can be removed from resin in the same electrical field by parallel charging with resin. The processes in the electrode chambers correspond to those in the electrolytic procedure.

The aqueous phase separated off after the reaction to prepare the resin can also be treated in an analogous manner in order to recover the alkali in a pure form. If appropriate, the discharge from the reactor can be fed directly to the electroextraction, without separation of the phases, in order to recover the alkali in one step. The resin/water separation can then be carried out subsequently.

Further embodiments of the processes according to the invention are conceivable, such as integration of the membrane cell or membrane cells directly into the reactor in which the resin is produced. After the preparation, the alkali can be removed from the resin directly in the reactor (provided with membranes), without removal, by applying an electrical voltage. With knowledge of the processes according to the invention, further embodiments are suggested to persons skilled in the art.

The processes according to the invention are preferably carried out under ambient pressure, and preferably at temperatures between 70° C. and 140° C., particularly preferably at 90° C. to 100° C.

Having generally described this invention, a further understanding can be obtained by reference to certain specific examples which are provided herein for purposes of illustration only and are not intended to be limiting unless otherwise specified. In the examples, the process of electroextraction is illustrated with the aid of electrolysis, since this is also the basis of the electrodialysis procedure and other variants.

Examples

The crude resin from acetophenone and formaldehyde which is employed still contains 4.34% by weight of NaOH. Before the electroextraction, it was diluted with water.

The cell used for the electroextraction was made of glass and was provided with two circular membranes, as shown in chamber 2 of FIG. 1. The cell had a capacity of about 350 ml. The temperature in the experiments was 95° C. The voltage was initially 20 to 60 V. In the course of the experiments, it was increased to 150 V. Further details are shown in the Table:

TABLE

| Data of the electrolysis cell | |
|---|---|
| Anode | of platinized titanium |
| Cathode | of steel |
| Membrane diameter | 40 mm |
| Membrane area (per membrane) | 12.5 cm$^2$ |
| Distance between the membranes | 130 mm |
| Distance between an electrode and a membrane | 30 mm |

Example 1

A membrane of the type C66-10F was used as the cation exchange membrane and a membrane of the type ACLE-5P was used as the anion exchange membrane, both from TOKUYAMA SODA Corp. A 1–3% strength by weight sodium hydroxide solution was initially introduced into the electrode chambers. The resin was stirred by a blade stirrer of glass. 320 g of an 11.1% strength by weight resin suspension were treated for 32 hours. At the end, only 15 ppm by weight of NaOH remained in the anhydrous (dried) resin.

Example 2

The experiment proceeded as in Example 1 240 g of a 5.3% strength by weight resin suspension were treated for 6 hours. At the end, only 70 ppm by weight of NaOH remained in the anhydrous (dried) resin.

Example 3

The experiment proceeded as in Example 1, but a membrane of the type CMB was used as the cation exchange membrane and a membrane of the type AHA was used as the anion exchange membrane, both from TOKUYAMA SODA Corp.

264 g of a 6.3% strength by weight resin suspension were treated for 6 hours. At the end, NaOH was no longer detectable in the anhydrous (dried) resin (detectability limit 10 ppm by weight of NaOH).

The disclosure of Germany priority application 196 04 903.2, filed Feb. 10, 1996, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A process for the preparation of a condensation resin of low catalyst content from a ketone and an aldehyde comprising reacting said ketone and said aldehyde in a polycondensation reaction in an aqueous medium in the presence of a basic catalyst to form said resin, said resin being contaminated with alkali ions from said basic catalyst, and then exposing the resin to an electrical field in a cell demarcated by ion-selective membranes permeable to the alkali ions whereby alkali ions are caused to migrate out of the resin through the membranes.

2. A process for the removal of an alkali from a condensation resin prepared from a ketone and an aldehyde by a polycondensation reaction in an aqueous medium in the presence of a basic catalyst, which comprises exposing the resin, contaminated with alkali ions from said basic catalyst, to an electrical field in a cell demarcated by ion-selective membranes permeable to the alkali ions whereby alkali ions are caused to migrate out of the resin through the membranes.

3. The process as claimed in claim 1, wherein the resin is dissolved or suspended in water or alkali.

4. The process as claimed in claim 1, wherein the alkali ions are removed at 70° to 140° C.

5. The process as claimed in claim 1, wherein the alkali ions are removed at 90° to 100° C.

6. The process as claimed in claim 1, wherein the alkali ions are removed and taken up outside the cell by additional alkali, and the alkali is then recycled for use as catalyst in the polycondensation reaction.

7. The process as claimed in claim 6, wherein the removal or the recycling of the alkali or both are carried out continuously or discontinuously.

8. The process as claimed in claim 1, wherein the alkali is removed electrolytically or electrodialytically.

9. The process as claimed in claim 1, wherein the ketone is acetophenone or a corresponding derivative thereof capable of undergoing a polycondensation reaction with an aldehyde, and the aldehyde is formaldehyde.

10. The process as claimed in claim 1, wherein the ketone is cyclohexanone or its corresponding derivative thereof capable of undergoing a polycondensation reaction with an aldehyde, and the aldehyde is formaldehyde.

11. The process as claimed in claim 2, wherein the resin is dissolved or suspended in water or alkali.

12. The process as claimed in claim 2, wherein the alkali ions are removed at 70° to 140° C.

13. The process as claimed in claim 2, wherein the alkali ions are removed at 90° to 100° C.

14. The process as claimed in claim 2, wherein the alkali ions are removed and taken up outside the cell by additional alkali, and the alkali is then recycled for use as catalyst in the polycondensation reaction.

15. The process as claimed in claim 14, wherein the removal or the recycling of the alkali or both are carried out continuously or discontinuously.

16. The process as claimed in claim 2, wherein the alkali is removed electrolytically or electrodialytically.

17. The process as claimed in claim 2, wherein the ketone is acetophenone or a corresponding derivative thereof capable of undergoing a polycondensation reaction with an aldehyde, and the aldehyde is formaldehyde.

18. The process as claimed in claim 2, wherein the ketone is cyclohexanone or a corresponding derivative thereof capable of undergoing a polycondensation reaction with an aldehyde, and the aldehyde is formaldehyde.

* * * * *

UNITED STATES PATENT AND TRADEMARK OFFICE
CERTIFICATE OF CORRECTION

PATENT NO. : 5,770,677
DATED      : June 23, 1998
INVENTOR(S): Sridhar et al.

It is certified that error appears in the above-identified patent and that said Letters Patent is hereby corrected as shown below:

On the title page, under item [56] Reference Cited, insert the following:

| | | \multicolumn{7}{c|}{FOREIGN PATENT OR PUBLISHED FOREIGN PATENT APPLICATION} | | |
|---|---|---|---|---|---|---|---|---|---|---|---|

| | | | DOCUMENT NUMBER | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | | 3 | 3 | 2 | 4 | 2 | 8 | 7 | 1/17/85 | Germany | | | |
| | | 8 | 8 | /0 | 7 | 9 | 7 | 5 | 10/20/88 | WIPO w/English Abstract | | | |
| | | | | | | | | | | | | | |

Signed and Sealed this

Sixteenth Day of February, 1999

Attest:

Attesting Officer

*Acting Commissioner of Patents and Trademarks*